United States Patent
Snyder (10) Patent No.: US 7,229,014 B1
(45) Date of Patent: Jun. 12, 2007

(54) SYSTEMS AND METHODS FOR ACCOUNT NUMBER GENERATION AND PROVISIONING

(76) Inventor: Richard Snyder, 120 E. 78th St., New York, NY (US) 10021

( * ) Notice: Subject to any disclaimer, the term of this patent is extended or adjusted under 35 U.S.C. 154(b) by 0 days.

(21) Appl. No.: 10/877,759

(22) Filed: Jun. 25, 2004

(51) Int. Cl.
*G06K 5/00* (2006.01)

(52) U.S. Cl. ............ 235/382; 705/52; 705/53; 235/380

(58) Field of Classification Search ........ 235/379–382, 235/487; 705/52–53, 61, 72–79, 34, 40
See application file for complete search history.

(56) References Cited

U.S. PATENT DOCUMENTS

| | | | |
|---|---|---|---|
| 5,832,068 A * | 11/1998 | Smith | 379/114.14 |
| 6,000,832 A * | 12/1999 | Franklin et al. | 700/232 |
| 6,206,283 B1 * | 3/2001 | Bansal et al. | 235/379 |
| 6,324,394 B1 * | 11/2001 | Vazvan | 455/406 |
| 6,332,133 B1 * | 12/2001 | Takayama | 705/39 |
| 6,404,866 B1 * | 6/2002 | Hopper et al. | 379/114.15 |
| 6,601,759 B2 * | 8/2003 | Fife et al. | 235/375 |
| 7,080,049 B2 * | 7/2006 | Truitt et al. | 705/75 |
| 7,100,821 B2 * | 9/2006 | Rasti | 235/380 |
| 2002/0029342 A1 * | 3/2002 | Keech | 713/184 |
| 2003/0130955 A1 * | 7/2003 | Hawthorne | 705/65 |
| 2003/0225618 A1 * | 12/2003 | Hessburg et al | 705/14 |
| 2004/0176134 A1 | 9/2004 | Goldwaite et al | 455/558 |
| 2006/0076400 A1 * | 4/2006 | Fletcher | 235/379 |

FOREIGN PATENT DOCUMENTS

| | | |
|---|---|---|
| WO | WO 02/41619 A1 * | 5/2002 |
| WO | WO 03/025824 A1 | 3/2003 |
| WO | WO 03/065277 A1 | 8/2003 |
| WO | WO 2004/014057 A1 | 2/2004 |
| WO | WO 2005/010716 A2 | 2/2005 |

OTHER PUBLICATIONS

PAYMENTONE "PhoneBill: Secure, Convenient Billing via the Phone Bill" http://www.paymentone.com/products/phonebill.asp.
Wikipedia.org article "credit_card_number" dated Dec. 1, 2004 (according to the Internet archive at www.archive.org), and available at http://web.archive.org/web/20041201100053/http://en.wikipedia.org/wiki/Credit_card_number.

* cited by examiner

*Primary Examiner*—Thien M. Le
*Assistant Examiner*—Edwyn Labaze
(74) *Attorney, Agent, or Firm*—Paul, Hastings, Janofsky & Walker LLP (57) ABSTRACT

A system for generating charge account numbers, wherein the charge account number is based on a number known to the consumer. For example, the consumer can provide a known number, such as their telephone number, and the system can generate a charge account number using the known number provided. Thus, the known number can be associated with a third party account, such as a telephone service account, and billing for the charge account and the third party account can be combined into one billing statement.

4 Claims, 6 Drawing Sheets

```
LOCAL CALLS
    XXXXXXX                      $1.23
    YYYYYYY                      $0.15
              Total              $1.38

REGIONAL CALLS
    ZZZZZZZ                      $3.21
              Total              $3.21

CREDIT CARD TRANSACTIONS
    AAAAAA                       $36.00
```

FIG. 9

| LOCAL CALLS | | |
|---|---|---|
| XXXXXXX | | $1.23 |
| YYYYYY | | $0.15 |
| | Total | $1.38 |
| REGIONAL CALLS | | |
| ZZZZZZZ | | $3.21 |
| | Total | $3.21 |

*Your Phone Bill*
*$4.59*

| CREDIT CARD TRANSACTIONS | | |
|---|---|---|
| AAAAAA | | $36.00 |
| BBBBBB | | $50.00 |
| | Total | $86.00 |

SYSTEMS AND METHODS FOR ACCOUNT NUMBER GENERATION AND PROVISIONING

BACKGROUND

1. Field of the Inventions

The field of the invention relates generally to the generation and provisioning of account numbers and more particularly to the generation and provisioning of credit card account numbers.

2. Background Information

Internet purchases have become more and more common. In a typical Internet transaction, a consumer finds an item they wish to purchase on a merchant's web page. The consumer then initiates a transaction and is asked to provide a credit card number to complete the purchase. Unfortunately, as anyone can attest, it is very difficult to remember a credit card number. Therefore, the consumer must have the card present when they are trying to make an "online" purchase of this type in order to provide the credit card number. Often, such online transactions are not consummated, i.e., they are terminated by the user. One likely reason for cancelled transaction is the fact that consumers do not have their cards present and cannot remember their credit card number.

Credit card numbers are difficult to remember, because they are long, and they are not based on anything known to the consumer. For example, there are several numbers most consumers are familiar with and that they tend to remember, e.g., telephone numbers, driver's license number, social security number, etc. These number tend to be somewhat shorter and somewhat more constant, whereas conventional credit card numbers tend to be longer and less constant. In other words, when a consumer gets a new card, upgrades accounts, or losses their card, etc., their credit card number changes. Thus, a typical credit card number is just not as indelible to the consumer as some other types of numbers.

SUMMARY OF THE INVENTION

A system for generating charge account numbers, wherein the charge account number is based on a number known to the consumer. In one aspect, the consumer can provide a known number, such as their telephone number, and the system can generate a charge account number using the known number provided. This can result in a charge account number that is easy to remember.

In another aspect, the known number can be associated with a third party account, such as a telephone service account, and billing for the charge account and the third party account can be combined into one billing statement.

These and other features, aspects, and embodiments of the invention are described below in the section entitled "Detailed Description of the Preferred Embodiments."

BRIEF DESCRIPTION OF THE DRAWINGS

Features, aspects, and embodiments of the inventions are described in conjunction with the attached drawings, in which.

DETAILED DESCRIPTION OF THE PREFERRED EMBODIMENTS

The systems and methods described herein are directed to systems and methods for generating charge account numbers based on known numbers that can be easily remembered by the consumer. The term "charge account" is intended to refer to any account that can be used to make purchases or transfer money, such as bank accounts and credit card accounts. The accounts are often associated with some type of card, such as an ATM card, bank card, or credit card. Thus, the account number generated using the systems and methods described herein can be used to create physical cards, mobile or virtual credit cards, charge cards, pre-paid cards or stored value cards that can be used broadly at a point-of-sale (POS).

In general, consumer-based known numbers, e.g. birthdays, telephone numbers, social security numbers, etc., are imbedded within the numbering sequence containing other intelligence numbers required to facilitate smooth and unique identification and transaction flow, providing the core numerical intelligence system for the card. A benefit of using a known numbers is that, in a world where consumers increasingly are required to manually input their credit card numbers, for example, into computers and other data entry devices, such as POS devices, the task of data entry can be simplified greatly, since the consumer will simply need to remember a single already known number, and possibly a few additional numbers.

Figure 1:
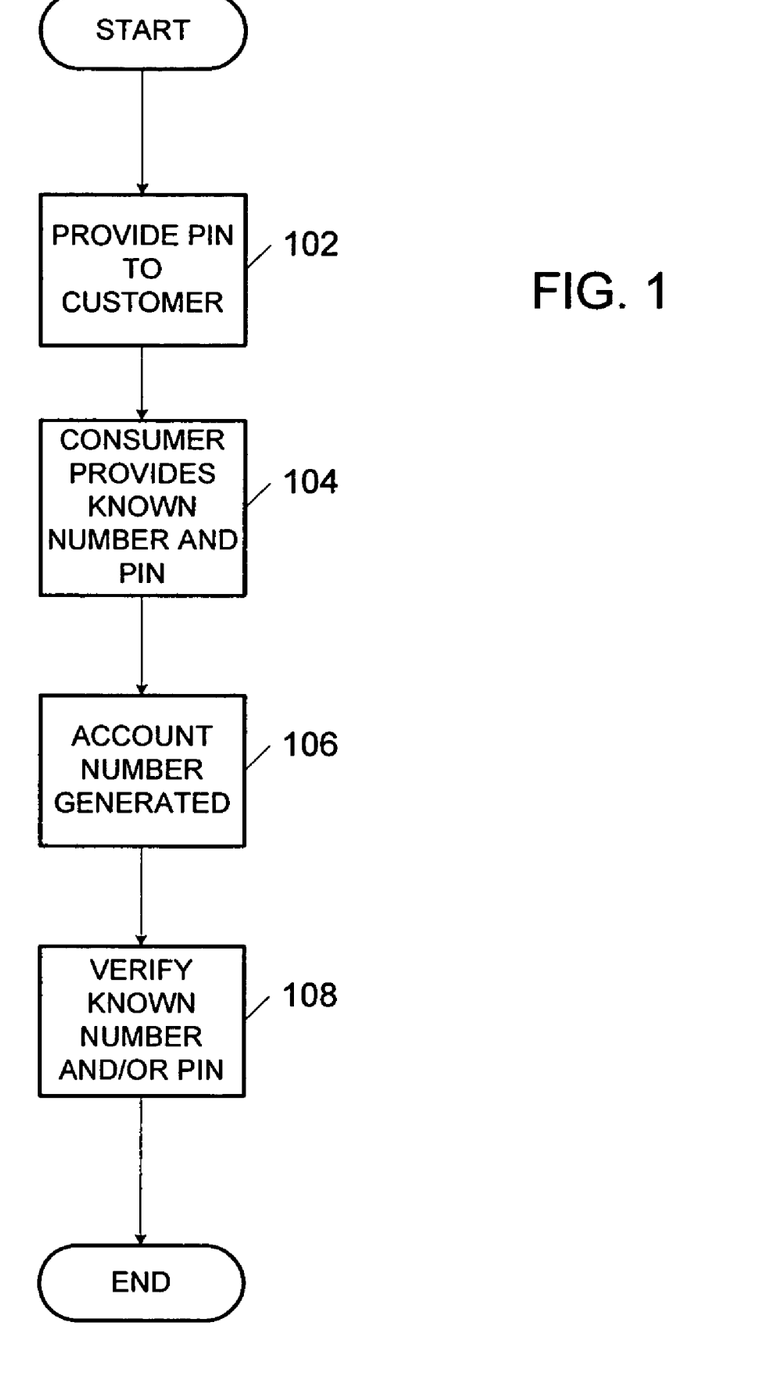
FIG. 1 is a flowchart illustrating an exemplary process wherein an account number is generated based on a known number provided by a consumer in accordance with one embodiment.

FIG. 1 is a flow chart illustrating a simple example process by which an account number can be generated that is based on a known number provided by a consumer. First, in step 102, a PIN can be provided to the consumer. For example, the consumer can log onto a website associated with the company with which the consumer has an account, or whishes to establish an account. When the consumer indicates that he is ready to generate an account number, he can be provided with, or asked to create, a Personal Identification Number (PIN) in step 104. Alternatively, a consumer can call into a servicing center and receive the PIN. PINs can also, for example, be distributed via kiosks, at POS locations, via email or regular mail, or via other marketing or advertising methods.

Once the consumer has the PIN, he can then provide the PIN and a known number in step 106. For example, the known number can be a telephone number. The known number and PIN can be provided, e.g., via the computer or telephone.

In step 106, the account number can then be generated based on the known number and the PIN provided by the consumer. For example, the PIN can simply be appended to the known number to generate an account number.

In step 108, establishment of the account and the information provided, e.g., known number and PIN, can be confirmed by contacting the consumer and requesting that they confirm the known number and/or PIN. If the known number is a telephone number, then the known number and PIN can be verified by calling the telephone number provided and asking the consumer to provide the PIN.

Other information can also be provided along with the known number and PIN. For example, security information can also be provided, such as mother's maiden name to be used for verification purposes when required. Such information can then be associated with the account and stored for later retrieval.

While the flow chart of FIG. 1 illustrates a simple method for generating an account number based on a known number. It can be necessary to include more information, or fields in the account number that is ultimately generated. For example, if there are several issuing entities, i.e., companies issuing account numbers based on known numbers as described herein, then a field can be included in the account number that can be used to identify the issuing entity. The systems and methods described below illustrate further embodiments for generating an account number based on a known number that can address such additional concerns.

Figure 2:
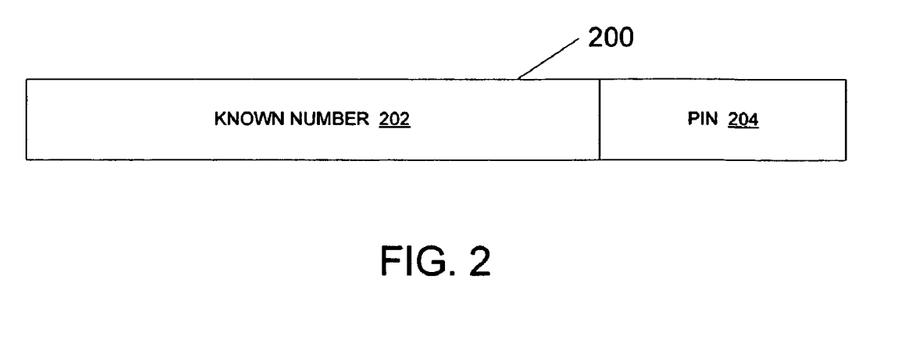
FIG. 2 is a diagram illustrating a possible format for an account number generated using the process of FIG. 1 from a known number and a PIN.

FIG. 2 is a diagram illustrating a possible format for an account number that is generated from a known number and a PIN as described above. As can be seen, the format consists of a field 202 for the known number and a field 204 for the PIN. Field 204 can, of course, precede field 202 depending on the implementation. Further, both fields 202 and 204 can comprise either all or part of the known number and PIN, respectively.

Figure 3:
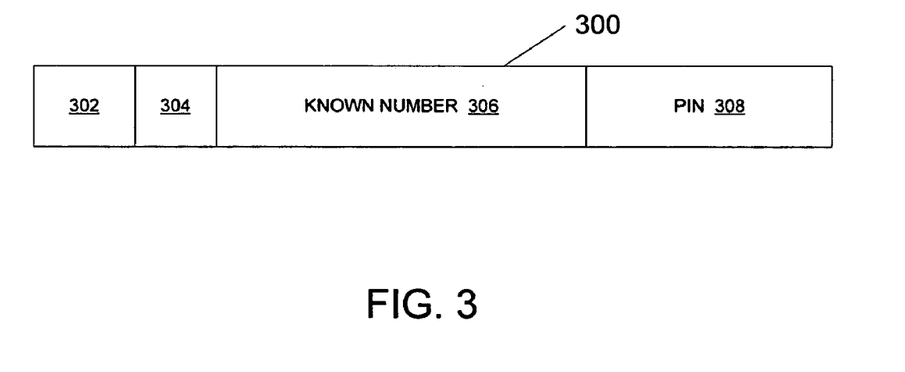
FIG. 3 is a diagram illustrating another possible format for an account number generated using the process of FIG. 1.

FIG. 3 illustrated an alternative format that comprises a issuing entity identifier field 302, a country code or currency identifier field 304, a known number field 306, and a uniqueness code, or check digit verification code field, 308. The following describes methods for using the format of FIG. 3 to generate an account number based on a known number.

First, the issuing entity identifier field 302 can be used to distinguish between multiple issuing entities. This can be illustrated using the following example:

Account Number—34 1 212 369 7255 76,
where:
  34=Issuing Identity Identifier;
  1=Country Code/Currency Identifier;
  212 369 7255=Imbedded known number (in this case a telephone number); and
  76=Uniqueness Code/Check Digit Verification Code.

Thus, as can be seen, when using the format of figure three, the issuing entity can be uniquely identified, but the consumer need only remember four additional numbers other and above their phone number.

The uniqueness code of field 308 can, for example, simply be the PIN described above. If the country code is not required, then field 304 can be omitted. If field 304 is omitted and field 308 comprise the PIN of field 204, then the format of FIG. 3 simply becomes the format of FIG. 2 with an additional field for indicating the issuing entity.

The known number does not, as explained above, need to be the consumer's telephone number. In the example below, for example, the consumer's social security number can be used:

Account number—541 078 23 4786 453,
where:
  54=Issuing Entity Identifier;
  1=Country Code/Currency Identifier;
  078 23 4786=Imbedded Social Security Number; and
  453=Uniqueness Code/Check Digit Verification Code.

ISO identifiers can also be used in field 302. Thus, the following example illustrated how the format of FIG. 3 can be used to create an account number using a newly issued ISO identifier:

Account Number—98 27 21 881922 345,
where:
  98=ISO identifier;
  27=Country Code/Currency Identifier (South Africa/Rand)
  21 881922=Imbedded Telephone Number; and
  345=Uniqueness Code/Check Digit Verifications Code.

In all of the above situations, the consumer needs to remember only a small series of numbers over and above the known number. This makes the whole number easier to remember and the input into devices requiring manual or verbal input.

Depending on the embodiment, the known number can be imbedded in any placement with regard to the other "intelligence numbers" included in, or used to generate, the account number. For example, the known number can be imbedded at the beginning of the series, the middle, or the end of the series. So, for example, the social security number example illustrated above could, with the same effect, have numbers arrayed as:

Account number—5491 453 078 23 4786.

In other words, the formats of FIGS. 2 and 3 are for illustration only and should not be seen to limit the possible formats, nor should any of the methods for generating an account number described herein be seen as limited to specific formats.

As mentioned above, the account numbers generated in accordance with the systems and methods described herein can be used in conjunction with various cards. For example, the account number can be used in conjunction with physical cards such as a credit card. In one embodiment, such a physical card can appear to the consumer as a standard credit or charge card, but with an embedded known number displayed in any human and/or machine readable form, including bar code, chip-in-card, RFID, OCR, etc.

Mobile cards can have the form of a mobile device, e.g., a phone, PDA, etc, that has either unidirectional, e.g., RFID, etc., or bi-directional, e.g., Bluetooth, wi-fi, infra-red, etc., communication capability. An account number generated in accordance with the systems and methods described herein, e.g., using a wireless telephone number associated with the mobile device, can then be stored in the mobile device. The mobile device can then, using whatever communication capability it includes, transmit the account number to a terminal or device configured to receive the account number. For example, if a cellular phone is configured to act as a mobile card, then a consumer can transmit their account number to a POS terminal using their cellular phone.

Virtual cards have no physical appearance and exist purely as a series of numbers that are used, e.g., on the web, or in a mobile or other data entry systems. In one embodiment, therefore, a virtual card number can be generated in accordance with the systems and methods described herein.

If the account numbers generated using the systems and methods described herein comply with the numbering specifications of the major card systems, i.e., Visa, MasterCard, American Express, Discover, JCB, etc., then a card issued with the number can be used in the various physical and on-line POS environments as any other card issued in compliance with such system. If the issuer chooses to create a unique numbering system or apply to ISO for a unique numbering system, then merchants will have to be signed up to accept the cards and the POS environments will need to be modified to accept the new numbering system. Once this is done, the transaction flow for authorization and settlement will be within the structure of merchant authorization and settlement in the market today.

Figure 4:
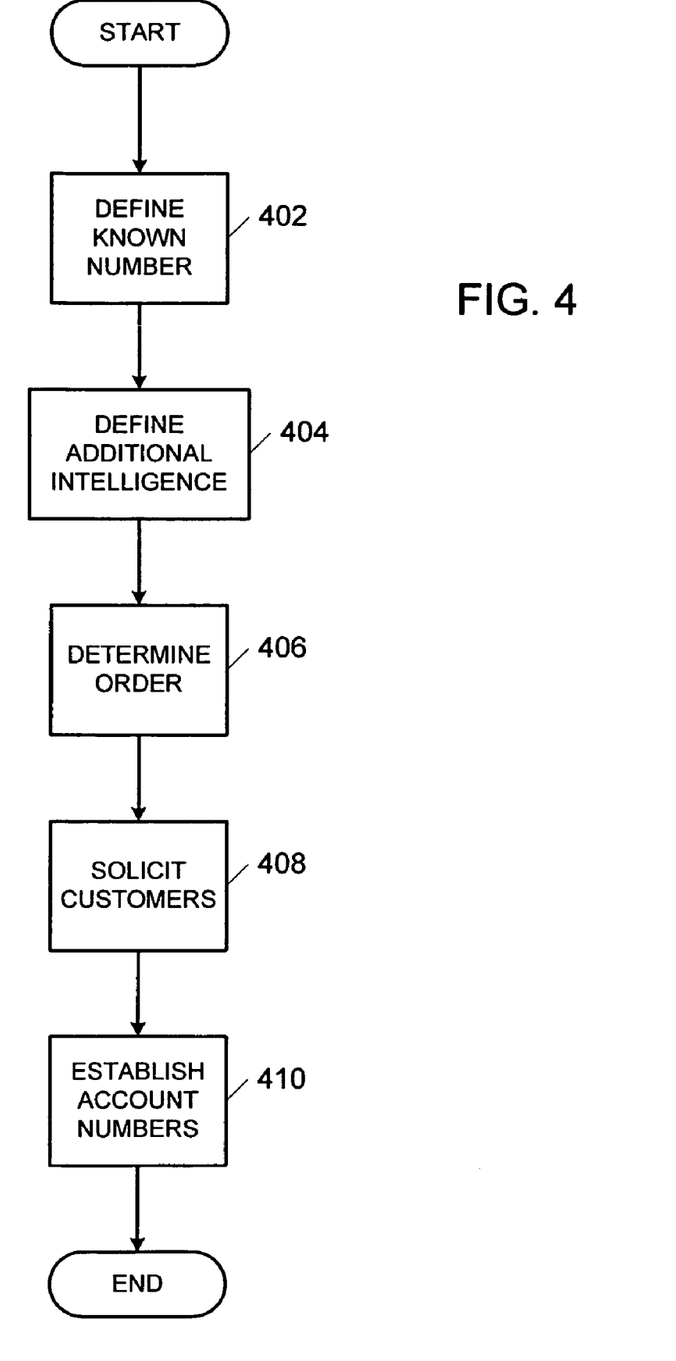
FIG. 4 is a flowchart illustrating a process for establishing account numbers based on a known number in accordance with one embodiment.

FIG. 4 is a more detailed flow chart illustrating some of the steps that can, depending on the embodiment be involved in the process for establishing account numbers based on a known number as described above. First, in step 402, the card issuer can define what known numbers the issuer will accept from the consumer to imbed within the numbering system of the account. For example, the issuer can decide to accept all telephone numbers. In step 404, the card issue can then decide what, if any, additional intelligence is required in the numbering system. For example, the card issuer can decide that a systems designator allowing merchant POS environments to know where to send the card for authorization, settlement, etc.

Other types of intelligence that can be required, depending on the embodiment, can include internal intelligence for use by the card issuer, including potentially: a currency designator, a country designator, an issuer designator, a check digit verification number, a uniqueness designator, which can allow the card number to be unique under all reasonable circumstances, including duplicate numbers, two people with a single known number, errors, etc.

In step 406, the card issuer can then determine what order the data set will be arrayed in, i.e., into which field each designator and sequence of numbers will fall in the overall number, recognizing the requirements of card systems and POS systems.

In step 408, the issuer can then solicit consumers and establish account numbers for them, in step 410, using the known numbers identified in step 402 and provided by the consumer.

Solicitation can occur via several methods. For example, a process that can be referred to as pre-solicitation can be used. This process is illustrated in conjunction with the process flow chart of FIG. 5. In pre-solicitation, the prospective customer is informed directly, e.g., using take-ones, mail, email, outbound phone, etc., or indirectly, e.g., using advertising, web pop-ups, etc., in step 502, that they are or may be eligible for a card, or account. The prospect then contacts the card issuer, in step 504, to provide the card issuer with relevant data required for credit approval and to provide them with the known number. Contact with the card issuer can be through mail, telephone communication, on-line computer communication, and/or mobile wireless communication.

Figure 5:
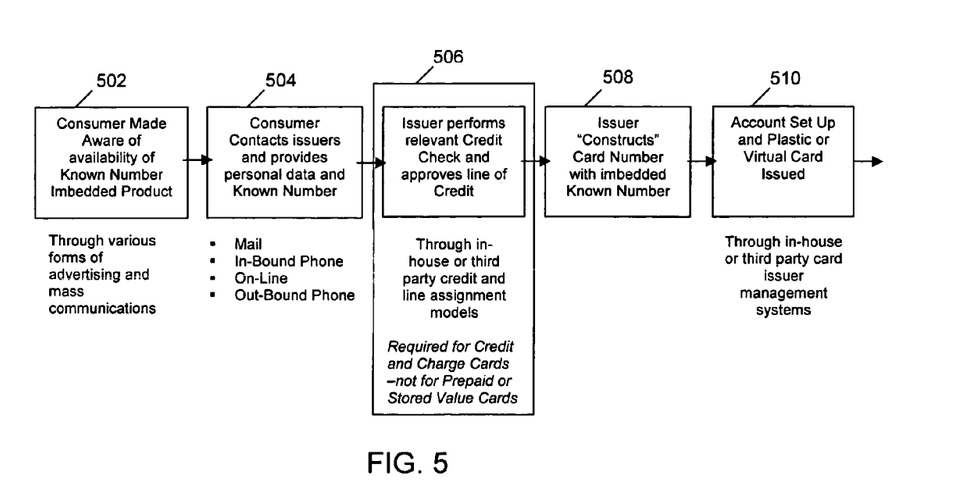
FIG. 5 is a flowchart illustrating a pre-solicitation process according to one embodiment.

In step 506, the card issuer can then perform the relevant credit check, if any is required, and approve the account. In step 508, the issuer can then generate the account number using the known number provided in step 504 and issue a card with the account number in step 510. Although, it should be remembered that the card can actually be a virtual card, or simply a number stored in a mobile device. Accordingly, issuance in step 510 can take many forms depending on the type of card, or use for the account.

Figure 6:
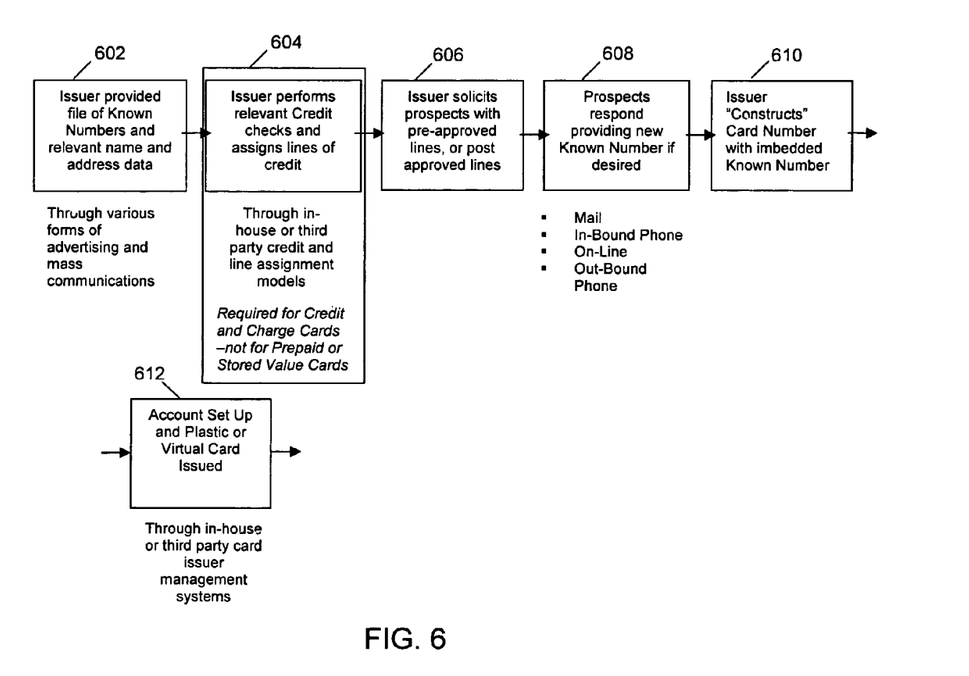
FIG. 6 is a flowchart illustrating a solicitation process in accordance with one embodiment.

An alternative method of solicitation is illustrated in conjunction with the process flow chart of FIG. 6. In the example of FIG. 6, a third party, for example a telephone service provider, provides the card issuer with information related to a prospective customer in step 602. The information can include the known number for the prospective customer, especially if the known number is, e.g., a telephone number and the telephone service provider is supplying the information. The information can also include, associated names, addresses and other available data on the prospective customer. The information can then be used to solicit prospective customers in step 606. If required, the information can also be used to perform any relevant credit checks, in step 604, and pre-approve the account.

In step 608, the customer can respond to the solicitation and can, in certain embodiments, request an alternative known number be used.

In step 610, the issuer can then generate the card number using the agreed upon known number as described above and issue a card with the account number in step 612.

It should be noted that issuance, whether the card is a physical or a virtual card, can be handled by the issuer or it can be outsourced to a card processor, who will issue the cards in accordance with the issuer's requirements.

Further, in addition to imbedding the known number in the numbering system of the card, the card may be issued with or without additional security features in the card and/or a PIN. The consumer can, depending on the embodiment, have the opportunity to change the PIN and then self select a PIN that is easily remembered by the Consumer.

Provisions can also be taken to provide enhanced risk management. For example, when known numbers are supplied by a third party, e.g. a telephone service provider, the third party may have additional data on the prospect that can enhance the predictability of risk associated with the prospect. These data, subject to relevant privacy and other regulatory constraints can be used in models by the issuer to determine whether the prospective customer is a risk. Such models can be special models constructed to use the enhanced data, or ancillary models that enhance existing or provide additional filters to models already being used.

Figure 7:
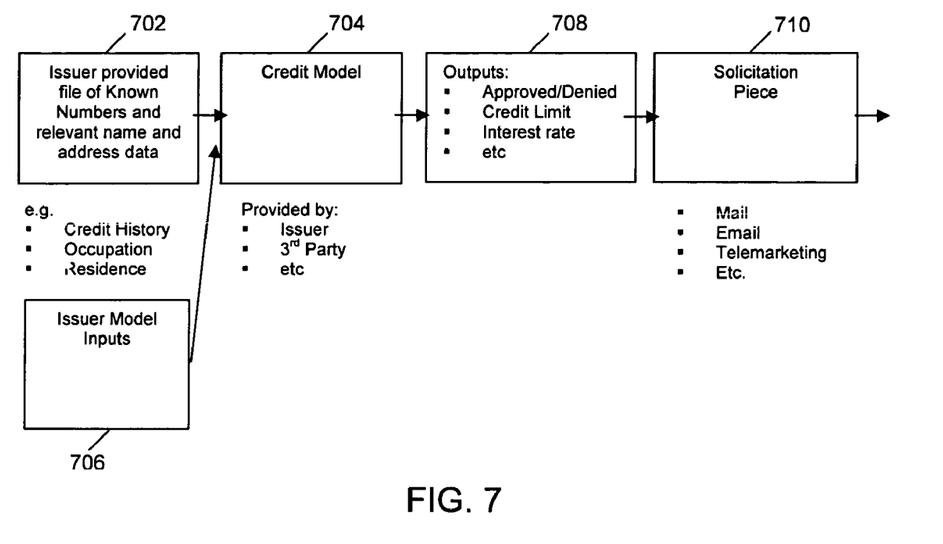
FIG. 7 is a flowchart illustrating a solicitation process that incorporates models for assessing the risk of potential customers.

This process is illustrated in FIG. 7. In step 702, the information is provided to the issuer. In step 704, the model is run to determine the risk using the information provided in step 702 and any additional model inputs provided by the issuer in step 706. In step 708, a determination can be made as to whether the potential customer is a good prospect based on the results obtained in step 704. If the determination is made to pursue the customer, then solicitation, e.g., as described in relation to FIG. 6 can proceed.

The data supplied by the third party, in step 702, can include, for example, credit performance on the third party product, time in residence, and period of employment.

The Enhanced Risk Management could apply whether the credit models being used are developed by the issuer, an outside credit model provider, a third party processor, or a third party bank providing risk management services to the issuer.

As mentioned above, if the known number is provided by a third party, e.g., a telephone number provided by a telephone service provider, then it combined billing can be offered. Combined billing takes advantage of the fact that these third parties have their own billing systems for billing phone falls and services to their customers. Thus, the possibility exists for the account transactions to be billed on the third party statement providing greater convenience for the customer in the form of one bill and one payment. The third party can also benefit through the ability to brand and offer cards, e.g., credit cards, as an extended product offering around their core offering. The issuer is benefited through reduced cost for providing statements and collecting.

Figure 8:
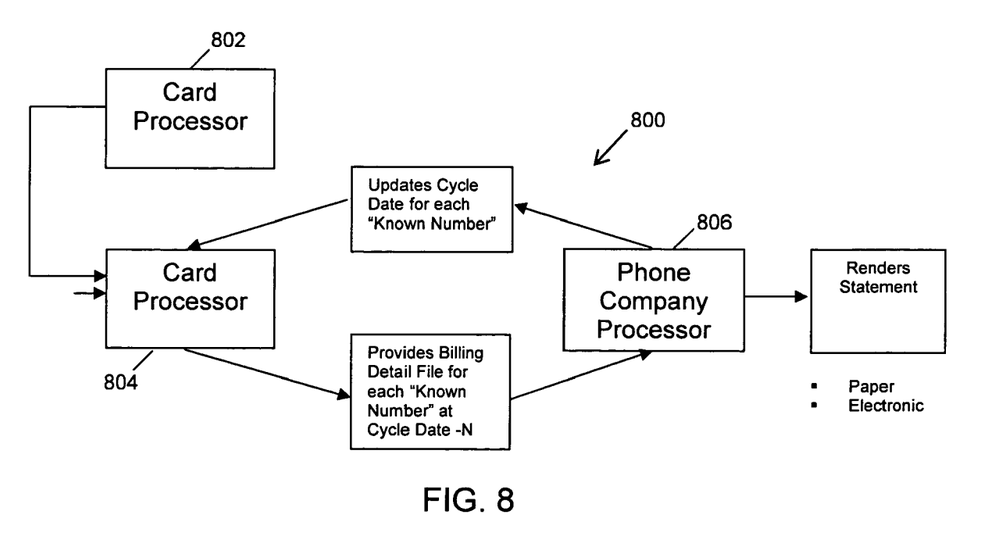
FIG. 8 is a diagram illustrating an example system configured to generate account numbers in which combined billing is implemented in accordance with one embodiment.

Using the telephone number and telephone service provider example, FIG. 8 is a diagram illustrating an example system 800 for generating account numbers in which combined billing is implemented. System 800 includes a charge account issuing authority 802, an account processing authority 804, and a third party billing authority 806, in this case a telephone service provider's billing authority.

The term "authority" used to identify charge account issuing authority 802, account processing authority 804, and third party billing authority 806 is intended to indicate that charge account issuing authority 802, account processing authority 804, and third party billing authority 806 communicate through the computing systems, hardware and software, associated with charge account issuing authority 802, account processing authority 804, and third party billing authority 806. Thus, depending on the embodiment the term authority can refer to one or more servers, such as Internet or web servers, file servers, and/or database servers, one or more routers, one or more databases, one or more software applications, one or more Application Program Interfaces (APIs), or some combination thereof. Further, the computing system associated with charge account issuing authority 802, account processing authority 804, and third party billing authority 806 can include one or more computers or computer terminals.

Charge account issuing authority 802 can be configured to generate an account number based on a known number, such as a telephone number provided by the telephone service provider associated with billing authority 806. Charge account issuing authority can, depending on the embodiment, also be configured to receive information on potential customers, initiate credit checks, implement risk assessment models, etc. as described above.

Billing authority 806 can be configured to generate and maintain billing statement information related to the third party's services, e.g., telephone services, while account processing authority 804 does the same for the accounts associated with the account numbers generated by charge account issuing authority 802. Thus, account processing authority 804 can be configured to provide billing authority 806 with the necessary details to bill account transactions fully on a single combined statement.

For example, if the account is a credit card account, then the consumer can see their credit card transactions on their telephone bill. The combined bill can take a number of forms depending on the legal and marketing requirements of, e.g., the telephone service provider, the form of the credit card issued, and the card issuer.

Figure 9:
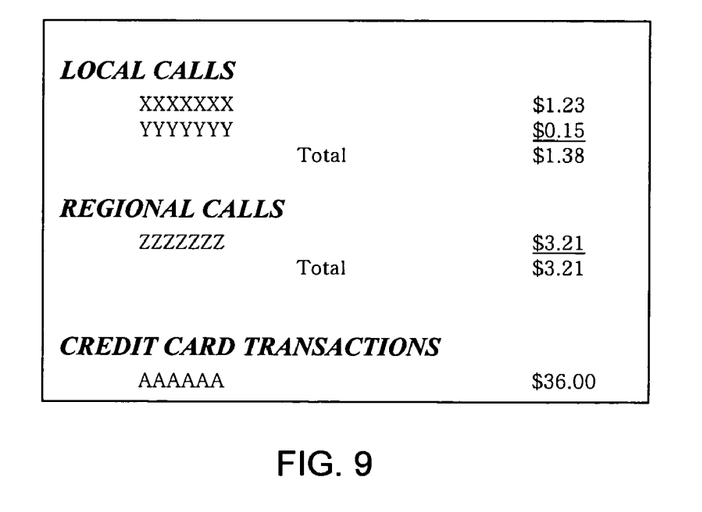
FIG. 9 is an example combined bill generated using the system of FIG. 8.
Figure 10:
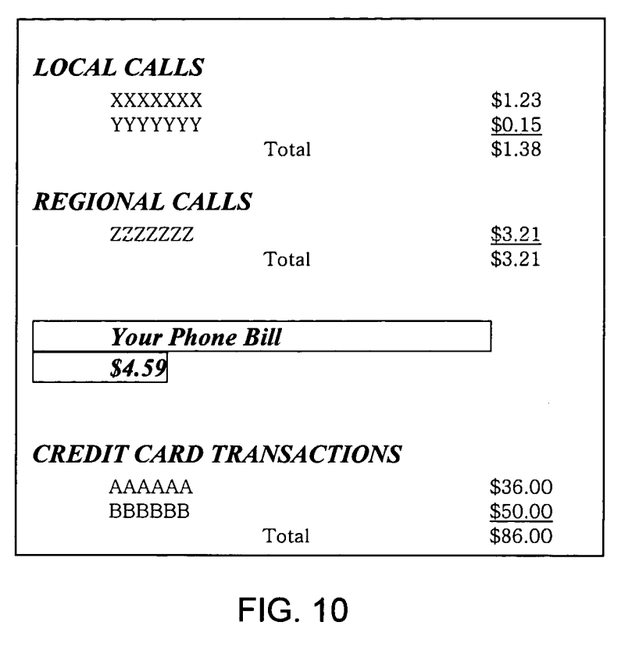
FIG. 10 is another example combined bill generated using the system of FIG. 8.

FIG. 9 illustrates an example combined bill where the credit card transactions form a segment within the overall telephone bill. FIG. 10 illustrates an example combined bill where the credit card transactions form a totally separate payment stream within the telephone bill. In each case a payment hierarchy should be established by mutual arrangement between the issuer and the third party. For example, in the case of the statement for $90.59 in FIG. 9, if the customer remits a payment of $90.00 there has to be an allocation methodology that provides a consistent outcome in the allocation of funds.

There are many allocation methods, for example, payment can be applied in the following order: minimum card balance, telephone balance, rest of card balance. This method provides reasonable equity to both entities, as the minimum card balance is paid to avoid penalties and the telephone bill is paid in accordance with normal full payment provisions for phone bills. Alternatively, the payment can be applied in the following order: minimum card balance, rest of card balance, and telephone balance. This method minimizes the interest rate that the consumer will pay on average and over time.

The processing stream should be closely coordinated so that account processing authority 804 knows when the billing authority 806 will process and render the bills. Accordingly, account processing authority 804 should be provided information on the third party billing cycles for each of the cards issued with known numbers and that will be billed on a combined statement. Account authority 804 can then forward the billing file to billing authority 806 in time for the information to be included in the statement.

In this regard, it should be pointed out that account processing authority can be interfaced with a plurality of third party billing authorities. Thus, combined billing can be offered with a variety of third party services.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. A charge account system, comprising:
a charge account issuing authority configured to receive a number known to a consumer and to generate a charge account number for the consumer based on the known number and a number unknown to the consumer for purchasing items, other than telephone services, from a plurality of vendors, wherein the known number is a telephone number, and wherein the charge account issuing authority is further configured to confirm the telephone number by placing a call to the telephone number;
an account processing authority coupled with the charge account issuing authority, the account processing authority configured to receive transaction information associated with the charge account number and to generate billing information associated with the charge account number based on the transaction information; and
a third party billing authority associated with a telephone service provider and coupled with the account processing authority, the third party billing authority configured to receive the billing information from the account processing authority and to generate a telephone bill which combines the billing information associated with the charge account number with billing information associated with telephone services provided by the telephone service provider to the consumer.

2. The charge account system of claim 1, wherein the charge account authority is further configured to receive a personal identification number and the number unknown to the consumer is the personal identification number.

3. The charge account system of claim 2, wherein the charge account authority is further configured to confirm the telephone number by receiving the personal identification number a second time, when the charge account authority places a call to the telephone number.

4. The charge account system of claim 1, wherein the telephone number is a wireless telephone number.

* * * * *